(12) United States Patent
Ishimoto et al.

(10) Patent No.: US 6,877,850 B2
(45) Date of Patent: Apr. 12, 2005

(54) INK JET RECORDING METHOD, INK SET, AND RECORDED MATTER USING THEM

(75) Inventors: Bunji Ishimoto, Nagano-ken (JP); Kiyohiko Takemoto, Nagano-ken (JP); Shuichi Kataoka, Nagano-ken (JP); Kazuhide Kubota, Nagano-ken (JP); Kazuaki Watanabe, Nagano-ken (JP)

(73) Assignee: Seiko Epson Corporation, Tokyo (JP)

(*) Notice: Subject to any disclaimer, the term of this patent is extended or adjusted under 35 U.S.C. 154(b) by 0 days.

(21) Appl. No.: 10/311,054

(22) PCT Filed: Apr. 24, 2002

(86) PCT No.: PCT/JP02/04095
§ 371 (c)(1),
(2), (4) Date: Jun. 9, 2003

(87) PCT Pub. No.: WO02/087886
PCT Pub. Date: Nov. 7, 2002

(65) Prior Publication Data
US 2004/0032473 A1 Feb. 19, 2004

(30) Foreign Application Priority Data
Apr. 24, 2001 (JP) .................................... 2001-125528
Apr. 24, 2001 (JP) .................................... 2001-126033

(51) Int. Cl.$^7$ ................................................. B41J 2/01
(52) U.S. Cl. .......................... 347/100; 347/96; 347/101
(58) Field of Search ............................ 347/100, 101, 347/96, 95; 106/31.6, 31.13; 523/160

(56) References Cited

U.S. PATENT DOCUMENTS

| | | | |
|---|---|---|---|
| 5,658,850 A | * | 8/1997 | Taniguchi et al. .......... 347/101 |
| 6,193,361 B1 | * | 2/2001 | Wen .............................. 347/96 |
| 2003/0085974 A1 | * | 5/2003 | Shimomura et al. ........ 347/101 |
| 2003/0193553 A1 | * | 10/2003 | Issler .......................... 347/100 |

FOREIGN PATENT DOCUMENTS

| | | | | |
|---|---|---|---|---|
| JP | 08-085218 | * | 4/1996 | ............ B41J/02/01 |
| JP | 8-174989 | | 7/1996 | |
| JP | 11-263052 | | 9/1999 | |
| JP | 11-277724 | | 10/1999 | |
| JP | 2000-141708 | | 5/2000 | |

OTHER PUBLICATIONS

Patent Abstracts of Japan of JP 8–174989 dated Jul. 9, 1996 and Japanese Patent Office Computer English translation.
Patent Abstracts of Japan of JP 11–277724 dated Oct. 12, 1999 and Japanese Patent Office Computer English translation.
Patent Abstracts of Japan of JP 11–263052 dated Sep. 28, 1999 and Japanese Patent Office Computer English translation.
Patent Abstracts of Japan of JP 2000–141708 dated May 23, 2000 and Japanese Patent Office Computer English translation.

* cited by examiner

Primary Examiner—Manish Shah
(74) Attorney, Agent, or Firm—Ladas & Parry LLP (57) ABSTRACT

It is an object of the present invention to provide an ink jet recording method and ink set with which recorded material with excellent gloss and greatly reduced gloss unevenness can be easily obtained without higher costs being entailed, the ink jet recording apparatus having to be modified or made larger, etc., and to provide an ink jet recording method with which a high-quality image can be obtained with a low gloss ratio (maximum value/minimum value) dependent on duty, as well as recorded material produced by this method. The present invention provides an ink jet recording method, in which a pigment ink composition and a clear ink composition containing a resin component are discharged to record information on a recording medium, wherein the discharge amount of the pigment ink composition and/or the discharge amount of the clear ink composition is adjusted so that the gloss will be substantially uniform over the entire recording surface of the recording medium after recording.

19 Claims, 1 Drawing Sheet

Fig. 1

INK JET RECORDING METHOD, INK SET, AND RECORDED MATTER USING THEM

TECHNICAL FIELD

This invention relates to an ink jet recording method and an ink set that give an image with substantially uniform gloss, and to recorded material obtained using these, and more particularly relates to an ink jet recording method and an ink set with which it is possible to obtain high-gloss recorded material with excellent weather resistance and reduced gloss unevenness, and to an ink jet recording method with which a high-quality image can be obtained with a low gloss ratio (maximum value/minimum value) dependent on duty, as well as recorded material produced by this method.

BACKGROUND ART

Ink jet recording is a printing method in which ink droplets are sprayed and made to adhere to paper or another recording medium. Recent years have witnessed amazing advances in ink jet recording technology, to the point that ink jet recording has come to be used even in the field of high-precision printing, which used to be the exclusive domain of silver halide photography or offset printing. This has been accompanied by the development of ink jet recording media having high gloss comparable to that of photographic paper, art paper, and the like used in the fields of silver halide photography and offset printing. The recording media used in a high-gloss ink jet recording method such as this generally comprise an ink receiving layer containing a porous pigment such as silica and provided over a substrate such as paper or a film.

The inks used when letters and/or graphics are recorded on the above-mentioned recording media used in high-gloss ink jet recording methods are typically a water-based ink composition whose main component is water and which contain colorants, resin components, and various other additives. Either dyes or pigments can be used as colorants, but pigments are superior in terms of their weather resistance (resistance to light, gas, water, moisture, and so forth), so demand for these pigments has been rising recently, and development of pigment ink compositions that take advantage of the characteristics of pigments is underway. Water-based pigment ink compositions containing a resin component have also been used in order to enhance the fixability of the pigment to the recording medium.

However, recorded material includes portions of high duty, portions of low duty, and non-recorded portions. Accordingly, when information is recorded using a pigment ink composition containing a resin component, many ink droplets are sprayed onto the high duty portions, so there is a correspondingly greater amount of resin component discharged, and more resin component adheres, whereas the discharge amount of ink droplets is smaller in the low duty portions, so less resin component adheres there. Also, since no ink droplets are sprayed onto the non-recorded portions, no resin component adheres there. Specifically, the high duty portions have a high gloss because of their higher resin component content, whereas the low duty portions have a lower gloss, and the gloss is lower still in the non-recorded portions. The glossiness therefore varies as a result of the difference in the amount of resin component that adheres, and this is reflected in recorded material quality as gloss unevenness. This problem of gloss unevenness is particularly pronounced in recording media used in high-gloss ink jet recording methods so often employed in high-precision printing.

Also, a problem that occurred with conventional ink jet recording methods that employed an ink composition containing a pigment as a colorant was that the gloss of the resulting printed image varied greatly with the duty level, that is, there was a large ratio (maximum value/minimum value) between the maximum value and minimum value for the gloss of the printed image that could be obtained when the duty was varied. This gloss ratio could be quite pronounced, depending on the type of pigment in the ink composition, and the pigment concentration in the ink composition.

One possible way to eliminate this gloss unevenness is to impart gloss by overcoating the recorded image with a resin film after the recording operation, but this results in resin component also being supplied to high duty portions, which already exhibit sufficient gloss, so cost becomes a problem.

Although not intended to solve the above-mentioned gloss unevenness, various methods have been proposed as prior art in which an overcoat layer is provided. For instance, Japanese Laid-Open Patent Application H8-174989 discloses a technique whereby, after ink jet recording, a transfer overcoat layer whose main component is a thermoplastic resin and which has been melt transferred via a heat-resistance film over the ink receiving layer of a recording medium used for high-gloss ink jet recording is provided for the purpose of achieving a printed image with excellent image quality and weather resistance. Problems with this technique, though, are that the cost is higher, the film becomes wrinkled, air gets trapped between the recording medium and the film, and so forth.

Japanese Laid-Open Patent Applications H11-277724 and 2000-141708 disclose a technique in which an image produced by ink jet recording is coated with a UV-curing coating agent, and this coating is then irradiated with UV rays and cured, the purpose of which is to enhance the scratch resistance of a recorded image formed on a recording medium with no ink absorptivity, such as a product made from plastic or metal. Problems with this technique, however, were that the cost was high, the process was complicated, UV rays which are harmful to humans were used, and so on.

Also, Japanese Laid-Open Patent Application H11-263052 discloses a technique in which a solid transparent resin capable of forming a coating is heated and melted and discharged from a nozzle over a recorded image during ink jet recording, so that the recorded image is covered with this transparent resin. This technique, however, is not suited to ordinary ink jet recording methods because it presupposes a so-called solid ink jet recording method.

Further, even if this technique were applied to an ordinary ink jet recording method, since a coating is formed over the entire recorded image, an extremely large amount of the transparent resin is used, which drives up the cost, and the ink tank installed in an ordinary ink jet recording apparatus cannot hold all of the liquid transparent resin, so the apparatus has to be modified and made larger, among other such problems.

It is therefore an object of the present invention to provide an ink jet recording method and ink set with which recorded material with excellent weather resistance and greatly reduced gloss unevenness can be easily obtained without higher costs being entailed, the ink jet recording apparatus having to be modified or made larger, etc.

It is a further object of the present invention to provide an ink jet recording method with which a high-quality image can be obtained with a low gloss ratio (maximum value/ minimum value) dependent on duty, as well as recorded material produced by this method.

DISCLOSURE OF THE INVENTION

The present invention solves the above problems by providing an ink jet recording method, in which a pigment ink composition and a clear ink composition containing a resin component are discharged to record information on a recording medium, wherein the discharge amount of the pigment ink composition and/or the discharge amount of the clear ink composition is adjusted so that the gloss will be substantially uniform over the entire recording surface of the recording medium after recording.

The phrase "substantially uniform gloss" as used in the present invention refers to a state in which the gloss ratio (maximum value/minimum value) dependent on duty is 1 or close to 1, and no gloss unevenness is apparent to the naked eye.

One embodiment of the present invention is the provision of an ink jet recording method, in which a pigment ink composition containing a resin component and a clear ink composition containing a resin component are discharged in any order to record information on a recording medium having an ink receiving layer, wherein the discharge amount of the pigment ink composition containing a resin component and the discharge amount of the clear ink composition containing a resin component are adjusted so that the total amount of resin component per unit of surface area will be substantially uniform over the entire recording surface of the resin medium.

A preferred aspect of this ink jet recording method is an ink jet recording method in which a plurality of types of resin component-containing pigment ink composition are used, wherein these resin component-containing pigment ink compositions and the resin component-containing clear ink composition are discharged in any order.

In another preferred aspect of this ink jet recording method, the resin component-containing pigment ink composition is a water-based pigment ink composition, and the clear ink composition is a water-based clear ink composition.

In yet another preferred aspect of this ink jet recording method, the clear ink composition is transparent, colorless, and/or achromatic.

In yet another preferred aspect of this ink jet recording method, the clear ink composition further contains a light resistance enhancer (such as a water-soluble hindered amine-based light stabilizer, a benzotriazole compound, or a phenol-based antioxidant).

In yet another preferred embodiment of this ink jet recording method, the resin component in the resin component-containing clear ink composition is a dissolved water-soluble resin, fine particles of polymer, or a resin dispersant.

In yet another preferred aspect of this ink jet recording method, the resin component in the resin component-containing clear ink composition is a dissolved water-soluble resin, fine particles of polymer, a resin encapsulating a pigment, or a resin dispersant.

In yet another preferred aspect of this ink jet recording method, the recording surface of the recording medium is a high duty region, a low duty region, and/or a non-discharge region in relation to the resin component-containing pigment ink composition.

The present invention also relates to an ink set used in an ink jet recording method, containing a pigment ink composition containing a resin component, and a clear ink composition containing a resin component.

In a preferred aspect of the ink set of the present invention, a plurality of types of resin component-containing pigment ink compositions are contained.

Another embodiment of the present invention is solving the stated problems by providing an ink jet recording method in which at least one type of pigment ink composition and at least one type of clear ink composition containing a resin component but containing no colorant are discharged in the same process to form a printed image on a recording medium, wherein the discharge amount of the clear ink composition is adjusted according to the duty of the pigment ink composition.

The phrase "in the same process" as used here refers to a process in which a single specific image is formed from both a pigment ink composition and a clear ink composition within a single recording (one pass). Therefore, in addition to a case in which the two compositions are discharged at exactly the same time, "in the same process" also encompasses a case in which the pigment ink composition is first discharged and then the clear ink composition is discharged, all within a single pass, and a case in which the clear ink composition is first discharged and then the pigment ink composition is discharged.

When the word "duty" is used alone in the present invention, it shall be defined as the duty of the pigment ink composition unless otherwise specified.

In a preferred aspect of this ink jet recording method, the colored ink composition is composed of two or more types, and the clear ink composition is composed of a single type.

In another preferred aspect of this ink jet recording method, the discharge amount of the clear ink composition is increased when the duty is low, and the discharge amount of the clear ink composition is reduced when the duty is high.

In yet another preferred aspect of this ink jet recording method, the fine particles of polymer are added as a resin emulsion to the clear ink composition.

The present invention also provides recorded material, wherein a printed image is formed on a recording medium by using the above-mentioned ink jet recording method.

Yet another embodiment of the present invention provides the above-mentioned ink jet recording method, wherein the combined discharge amount of the pigment ink composition and the clear ink composition is adjusted so as to be constant when the duty of the pigment ink composition is low, and when the duty of the pigment ink composition is high, the discharge amount of the clear ink composition is kept at a constant small amount regardless of the duty of the pigment ink composition.

BEST MODE FOR CARRYING OUT THE INVENTION

The ink jet recording method, ink set, and recorded material of the present invention will now be described in detail through reference to preferred embodiments thereof.

Ink Jet Recording Method in a First Embodiment

In the ink jet recording method of this embodiment, the discharge amount of the resin component-containing pigment ink composition and the discharge amount of the resin component-containing clear ink composition are adjusted so that the combined amount of resin component per unit of surface area will be substantially uniform over the entire recording surface of the recording medium. There is an inherent variance in the duty with printed material formed on a recording medium surface, and the amount of ink composition droplets discharged per unit of surface area onto the recording medium surface varies according to this duty. When just an ink composition is discharged onto a recording medium surface, the amount of resin component adhering per unit of surface area varies along with the amount of droplets of this composition, resulting in gloss unevenness, so in the method of the present invention, additional resin component is supplied by discharging the resin component-containing clear ink composition in an amount that varies with the duty of the ink composition, so that the amount of resin component adhering per unit of surface area is made uniform over the entire recording surface of the recording medium.

In a preferred aspect of the method in this embodiment, the discharge amount of the clear ink composition onto the portion of highest duty with respect to the pigment ink composition is set at the minimum amount (and particularly no discharge at all). The discharge amount of the clear ink composition onto the non-recorded portion, where no pigment ink composition is discharged, is set at the maximum amount, the amount of resin component adhering in the highest duty portion and the amount of resin component adhering in the non-recorded portion are made substantially equal, and the gloss in the highest duty portion can be made substantially the same as the gloss in the non-recorded portion. The discharge amount of the clear ink composition onto the portion between the highest duty portion and the non-recorded portion (that is, the low duty portion) is varied according to the duty differential thereof. Specifically, a head for the clear ink composition can be provided to the recording apparatus used for implementing the method in this embodiment, and the amount of droplets of clear ink composition discharged from this head can be adjusted with a suitable control device.

In specific terms, the "duty" referred to in this Specification can be calculated from the following equation.

$$D = [N/(Lr \times Wr)] \times 100 \qquad (1)$$

In this equation (1), D is the duty, N is the number of actual printed dots per unit of surface area, Lr is the length resolution per unit of surface area, and Wr is the width resolution per unit of surface area. Therefore, when recording is performed without dot modulation in actual printing, for example, the duty is proportional to the number of ink droplets and the amount of ink supplied. When the recording does include dot modulation, the amount of ink supplied should be suitably determined by derivation from the above-mentioned equation (1) and the ink weight per dot, which depends on dot modulation.

The clear ink composition that can be used in this embodiment can be any non-colored ink, that is, a transparent ink, colorless ink, achromatic ink (such as a white ink), or lightly colored ink, with a transparent ink being preferable. "Lightly colored ink" means an ink with a low pigment content.

The clear ink composition that can be used in this embodiment can be either a water-based or organic ink, but it is preferable for it to be based on the same solvent as that in the pigment ink composition used at the same time. It is also preferable for the clear ink composition and the pigment ink composition both to be water-based.

The clear ink composition that can be used in this embodiment can contain a resin component in a state in which a water-soluble resin is dissolved in water, or can contain a resin component in a state in which fine particles of polymer are in water. The resin component is preferably transparent fine particles of polymer.

There are no particular restrictions on the above-mentioned transparent fine particles of polymer, as long as they are capable of forming a transparent coating immediately after the discharge of the clear ink composition. In terms of light resistance, it is preferable to use fine particles of polymer having unsaturated double bonds and/or unsaturated triple bonds in their molecules, or fine particles of polymer having highly reactive substituents. Examples of transparent fine particles of polymer that can be used to advantage in this embodiment include acrylic acid-based polymers or copolymers of acrylic acid (or methacrylic acid) and derivatives thereof (such as methyl acrylate, ethyl acrylate, methacrylic acid, and methyl methacrylate); rubber-based polymers such as urethane, styrene-butadiene rubber (SBR), ethylene-vinyl acetate (EVA), and acrylonitrile-butadiene rubber (NBR); natural macromolecular compounds such as starch, modified starch, gelatin, casein, and soy protein; cellulose modified polymers such as carboxymethyl cellulose (CMC), hydroxyethyl cellulose (HEC), and hydroxypropyl cellulose (HPC); and polyvinyl alcohol (PVA), modified PVA, polyacrylamide, polyethylene, polyacetal resin, guar gum, polyester, polyvinylpyrrolidone, and ethylene-polyvinyl alcohol copolymers. These can be used singly or in combinations of two or more. Of these, (meth)acrylic acid-based polymers are preferred because of their good discharge stability, safety, fast drying property, weather resistance, and so forth.

The clear ink composition can contain the above-mentioned transparent fine particles of polymer as an emulsion. Also, the clear ink composition can contain the dispersion resin used as a pigment dispersion resin in the resin component-containing ink composition used concurrently. There are no particular restrictions on this dispersion resin, as long as it is a resin that will adsorb to a pigment surface so that the pigment particles can be dispersed in water, or a resin that will cover a pigment surface so that the pigment particles are dispersed in water in encapsulated form, or another such resin that allows pigment particles to be stably dispersed in water. This resin can be contained in the clear ink composition irrespective of the dispersion form or whether the resin is water-soluble or not.

A styrene-(meth)acrylic acid-based water-soluble resin can be used, for example, as a water-soluble dispersant, specific examples of which include styrene acrylic acid copolymer ammonium salts and styrene acrylic emulsions (trade name Grandol PP1100, made by Dainippon Ink & Chemicals).

The water contained in the clear ink composition can be ion exchange water, ultrafiltration water, reverse osmosis water, distilled water, or other such pure or ultra-pure water. In particular, it is preferable to use water that has been sterilized by ultraviolet irradiation, the addition of hydrogen peroxide, or the like because this will prevent the growth of mold and bacteria, and will extend the shelf life of the clear ink composition.

This clear ink composition preferably contains the resin component in an amount of 0.1 to 10 wt %, and even more preferably 1 to 5 wt %, with respect to the weight of the entire clear ink composition. The result of keeping the resin component content within the above range is that an coating that is adequate for preventing gloss unevenness and enhancing weather resistance can be formed on the recording medium without diminishing the discharge stability from the printer head, the speed of drying, handling safety, and so forth.

It is also preferable for the clear ink composition to contain a light resistance enhancer because this will further improve the light resistance of the recorded material and prevent the degradation of the transparent fine particles of polymer themselves.

The light resistance enhancer should have the action of inhibiting the fading of a recorded image by ultraviolet or visible light, and is preferably at least one type of compound selected from the group consisting of water-soluble hindered amine-based light stabilizers (HALS), UV absorbents, antioxidants, and quenchers. Examples of UV absorbents include benzophenone compounds, salicylate compounds, benzotriazole compounds, and cyanoacrylate compounds, as well as metal oxides such as titanium oxide, zinc oxide, selenium oxide, and cerium oxide. Examples of antioxidants include hindered phenol and other such phenol-based agents, hydroquinone, and agents based on chroman, coumarone, benzotriazole (those having no UV absorptivity), and spiroindane. Examples of quenchers include inorganic metal complexes of nickel, cobalt, and so forth. Of these, it is particularly favorable to use a water-soluble HALS, a benzotriazole compound (including both those with UV absorptivity (those used as UV absorbents) and those without (those used preferably as antioxidants)), and phenol-based antioxidants.

The above-mentioned light resistance enhancer is preferably contained in the clear ink composition in an amount of 0.01 to 30 wt %, with 0.1 to 20 wt % being even better.

The clear ink composition can also contain a penetration promoter or high-boiling organic solvent for the purpose of preventing nozzle clogging and so forth. Any compound that is ordinarily added to ink compositions can be used with no particular restrictions as the penetration promoter or high-boiling organic solvent, but specific examples will be given below.

It is preferable for the resin component in the clear ink composition to rapidly form a coating immediately after discharge, and therefore the minimum film formation temperature (MFT) thereof should be no higher than 80° C., and preferably 40° C. or lower, with 0° C. or lower being better yet. "MFT" as used in this Specification means the temperature measured according to JIS K 6800.

From the standpoints of fast drying and film formability, the clear ink composition should have a solids concentration of 0.01 to 80 wt %, and preferably 0.1 to 50 wt %.

From the standpoint of discharge stability, the clear ink composition should have a viscosity of no more than 50 mPa·S at a temperature of 20° C. Examples of how to adjust the viscosity to within this range include adding a thickener or pH adjuster, adjusting the solids concentration, and adjusting the molecular weight of the resin component.

From these same standpoints, the clear ink composition should have a surface tension of 15 to 50 mN/m, and preferably 25 to 50 mN/m.

Examples of how to adjust the surface tension to within this range include adding a surfactant or an organic solvent.

In this embodiment, it is preferable for the recording medium to be one with which it is possible for pigment particles to remain behind on the recording medium surface. An example of such a recording medium is one comprising an ink receiving layer provided on a substrate. This ink receiving layer can be the uppermost layer of the recording medium, or it can be an intermediate layer having a gloss layer thereon. Known recording media such as this include so-called absorbent (also called hollow) recording media in which a porous pigment and a binder resin are contained in the ink receiving layer, and so-called swellable recording media in which casein, modified PVA, gelatin, modified urethane, or another such resin is contained in the ink receiving layer. Either of these types of recording medium can be used in this embodiment.

Examples of the above-mentioned porous pigment contained in the ink receiving layer of an absorbent recording medium include calcium carbonate, calcium sulfate, barium sulfate, titanium dioxide, kaolin, clay, talc, magnesium silicate, calcium silicate, smectite clay, silica/alumina hybrid sol, alumina hydrate such as pseudo-boehmite, and precipitated, gelled, vapor phase, or other such silica. These can be used singly or in combinations of two or more types.

There are no particular restrictions on the above-mentioned binder resin contained in the ink receiving layer of the absorbent recording medium, as long as it is a compound capable of binding and of raising the strength of the ink receiving layer, but examples include polyvinyl alcohol, silanol modified polyvinyl alcohol, vinyl acetate, starch, carboxymethyl cellulose and other cellulose derivatives, casein, gelatin, styrene-butadiene copolymers and other conjugated diene copolymer latexes, ethylene-vinyl acetate copolymers and other vinyl copolymer latexes, and polymers of acrylic acid and methacrylic acid and other acrylic copolymer latexes.

The ink receiving layer, whether it is the ink receiving layer of an absorbent recording medium or the ink receiving layer of a swellable recording medium, can also contain various additives as necessary, examples of which include fixatives, fluorescent whiteners, water resistance agents, mildew inhibitors, preservatives, dispersants, surfactants, thickeners, pH regulators, defoaming agents, and/or humectants.

Examples of the above-mentioned substrate on which the ink receiving layer is provided include paper (included sized paper); resin coated paper comprising paper that has been coated with polyethylene, polypropylene, polyester, or the like; baryta paper; thermoplastic resin films of polyethylene terephthalate, polyethylene, polypropylene, or the like; synthetic paper; and sheets formed from synthetic fibers.

As discussed above, there are no particular restrictions on the recording medium used in this embodiment as long as it has the above-mentioned ink receiving layer on the above-mentioned substrate, but a particularly favorable aspect is a recording medium having the above-mentioned substrate and the above-mentioned ink receiving layer provided thereover as the uppermost layer. It is favorable, for example for the substrate and ink receiving layer to have the following properties.

Paper (the type that contains wood pulp) is preferable as the substrate, and the basis weight thereof is preferably 100 to 350 g/m$^2$, and even more preferably 180 to 260 g/m$^2$. The thickness should be 100 to 400 µm, and preferably 180 to 260 µm.

It is preferable for the ink receiving layer to contain wet-process silica as the above-mentioned porous pigment in an amount (calculated as solids) of 50 to 60 wt % and polyvinyl alcohol as the above-mentioned binder resin in an amount of 30 to 40 wt % with respect to the total weight of the ink receiving layer, because this will result in better ink absorption, print durability, and so on. In terms of ink absorption, it is also preferable for the coating amount (calculated as solids) of the ink receiving layer to be from 5 to 50 g/m$^2$. The thickness of the ink receiving layer itself should be 10 to 40 µm, and preferably 20 to 30 µm.

The resin component-containing pigment ink composition used in this embodiment can be any such composition that is commonly used in ink jet recording methods, and can be either water-based or organic solvent-based. It is preferable for it to be based on the same solvent as that of the clear ink composition that is used concurrently. It is also preferable for the clear ink composition and the pigment ink composition both to be water-based.

The pigment ink composition used in this embodiment can contain a resin component in a state in which a water-soluble resin is dissolved in water, or can contain a resin component in a state in which fine particles of polymer are in water, or can contain a resin encapsulating a pigment, or can contain a resin dispersant. The resin component is preferably a transparent polymer.

If the pigment ink composition contains a resin component in the form of a water-soluble resin, fine particles of polymer, or a resin dispersant, substantially the same materials as the above-mentioned resin components contained in the clear ink composition can be added by the same methods. If the pigment ink composition contains a resin component encapsulating a pigment, then it is also possible for a resin substantially the same as resin used to encapsulate a pigment, either directly as it is (that is, without employing any special method such as encapsulation) or after dissolving or dispersing it in the clear ink composition.

The pigment contained in the pigment ink composition can be an inorganic pigment or an organic pigment, which can be used singly, or a plurality of types can be mixed as desired. The above-mentioned inorganic pigment can be, for example, titanium oxide or iron oxide, as well as carbon black manufactured by a known method such as a contact process, furnace process, or thermal process. The above-mentioned organic pigment can be, for example, an azo pigment (including azo lake pigments, insoluble azo pigments, condensed azo pigments, chelate azo pigments, and so on), a polycyclic pigment (such as phthalocyanine pigments, perylene pigments, perinone pigments, anthroquinone pigments, quinacridone pigments, dioxazine pigments, thioindigo pigments, isoindolino pigments, and quinoflanone pigments), dye chelates (such as basic dye chelates and acidic dye chelates), nitro pigments, nitroso pigments, and aniline black.

The following are more specific examples of the above pigments. First, examples of favorable pigments for a yellow ink composition include C.I. Pigment Yellow 1, C.I. Pigment Yellow 2, C.I. Pigment Yellow 3, C.I. Pigment Yellow 12, C.I. Pigment Yellow 13, C.I. Pigment Yellow 14, C.I. Pigment Yellow 16, C.I. Pigment Yellow 17, C.I. Pigment Yellow 73, C.I. Pigment Yellow 74, C.I. Pigment Yellow 75, C.I. Pigment Yellow 83, C.I. Pigment Yellow 93, C.I. Pigment Yellow 95, C.I. Pigment Yellow 97, C.I. Pigment Yellow 98, C.I. Pigment Yellow 109, C.I. Pigment Yellow 110, C.I. Pigment Yellow 114, C.I. Pigment Yellow 128, C.I. Pigment Yellow 129, C.I. Pigment Yellow 138, C.I. Pigment Yellow 150, C.I. Pigment Yellow 151, C.I. Pigment Yellow 154, C.I. Pigment Yellow 155, C.I. Pigment Yellow 180, and C.I. Pigment Yellow 185. Of these, examples of pigments that are particularly favorable to use include C.I. Pigment Yellows 74, 110, and 128.

Examples of favorable pigments for a magenta ink composition include C.I. Pigment Red 5, C.I. Pigment Red 7, C.I. Pigment Red 12, C.I. Pigment Red 48 (Ca), C.I. Pigment Red 48 (Mn), C.I. Pigment Red 57 (Ca), C.I. Pigment Red 57:1, C.I. Pigment Red 112, C.I. Pigment Red 122, C.I. Pigment Red 123, C.I. Pigment Red 168, C.I. Pigment Red 184, and C.I. Pigment Red 202. Of these, examples of pigments that are particularly favorable to use include C.I. Pigment Red 122.

For the pigment of a light magenta ink composition, the same pigments as those listed above for a magenta ink composition can be used in a lower concentration. A light magenta ink composition can be prepared by suitably varying the proportions of the pigment and other components used in the magenta ink composition.

Examples of favorable pigments for a cyan ink composition include C.I. Pigment Blue 1, C.I. Pigment Blue 2, C.I. Pigment Blue 3, C.I. Pigment Blue 15:3, C.I. Pigment Blue 15:4, C.I. Pigment Blue 15:34, C.I. Pigment Blue 16, C.I. Pigment Blue 22, C.I. Pigment Blue 60, C.I. Vat Blue 4, and C.I. Vat Blue 60. Of these, examples of pigments that are particularly favorable to use include C.I. Pigment Blue 15:3.

For the pigment of a light cyan ink composition, the same pigments as those listed above for a cyan ink composition can be used in a lower concentration. A light cyan ink composition can usually be prepared by suitably varying the proportions of the pigment and other components used in the cyan ink composition.

The preferred pigment for a black ink composition is carbon black, specific examples of which include No. 2300, No. 900, MCF88, No. 33, No. 40, No. 52, MA7, MA8, MA100, No. 2200B, and other such products of Mitsubishi Chemical; Raven 5750, Raven 5250, Raven 5000, Raven 3500, Raven 1255, Raven 700, and other such products of Columbian Chemicals; Regal 400R, Regal 1660R, Mogul 1, Monarch 700, Monarch 800, Monarch 880, Monarch 900, Monarch 1000, Monarch 1100, Monarch 1300, Monarch 1400, and other such products of Cabot; Color Black FW1, Color Black FW2, Color Black FW2V, Color Black FW18, Color Black FW200, Color Black S150, Color Black S160, Color Black S170, Printex 35, Printex U, Printex V, Printex 140U, Special Black 6, Special Black 5, Special Black 4A, Special Black 4, and other such products of Degussa.

The above-mentioned pigment ink composition preferably contains water as its main solvent. This water can be the same as that contained in the clear ink composition.

Also, a $C_3$ or higher alkyl ether derivative of a polyhydric alcohol can be contained as a penetration promoter in the pigment ink composition. Examples of $C_3$ or higher alkyl ether derivatives of polyhydric alcohols include diethylene glycol monobutyl ether, triethylene glycol monobutyl ether, propylene glycol monobutyl ether, and dipropylene glycol monobutyl ether. These can be used singly or in combinations of two or more types.

The pigment ink composition can also contain a low-boiling organic solvent for the purpose of shortening the drying time of the ink composition. Examples of low-boiling organic solvents include methanol, ethanol, n-propyl alcohol, iso-propyl alcohol, n-butanol, sec-butanol, tert-butanol, iso-butanol, and n-pentanol. These can be used singly or in combinations of two or more types.

The pigment ink composition can also contain a high-boiling organic solvent as a wetting agent. Examples of high-boiling organic solvents include ethylene glycol, diethylene glycol, triethylene glycol, polyethylene glycol, polypropylene glycol, propylene glycol, butylene glycol, 1,2,6-hexanetriol, thioglycol, hexylene glycol, glycerol, trimethylolethane, trimethylolpropane, and other such polyhydric alcohols. These can be used singly or in combinations of two or more types.

The pigment ink composition can also contain a surfactant for the purpose of stabilizing the pigment dispersion. Examples of surfactants include anionic surfactants (such as sodium dodecylbenzenesulfonate, sodium laurate, and ammonium salts of polyoxyethylene alkyl ether sulfates) and nonionic surfactants (such as polyoxyethylene alkyl ethers, polyoxyethylene alkyl esters, polyoxyethylene alkyl phenyl ethers, polyoxyethylenealkylamines, and polyoxyethylenealkylamides). These can be used singly or in combinations of two or more types. Acetylene glycol-based surfactants can also be used, examples of which include Surfinol 82, 104, 440, 465, and 485 (all made by Air Products and Chemicals Inc.) and Olefin Y. These can be used singly or in combinations of two or more types.

If needed, the pigment ink composition can further contain any of various auxiliaries, such as viscosity regulators, preservatives, mildew inhibitors, pH regulators, dissolution auxiliaries, antioxidants, surface tension regulators, and/or dielectric constant regulators.

As discussed above, the pigment ink composition pertaining to this embodiment should at least contain a pigment, a resin component, and water, but from the standpoints of reliability and coloration of the ink composition, it is particularly favorable if the above-mentioned pigment is contained in an amount of 1 to 30 wt %, and preferably 1 to 10 wt %, the resin component is contained in an amount of 0.1 to 20 wt %, and preferably 0.5 to 5 wt %, and other components, such as the above-mentioned penetration promoter and/or surfactant, are contained.

The properties of the pigment ink composition can be adjusted as desired, but in terms of stable discharge from the head, it is preferable if the viscosity at a temperature of 20° C. is no higher than 10 mPa·s. In terms of the ink composition absorptivity, the surface tension thereof should be 5 to 50 mN/m, and preferably 20 to 40 mN/m.

In the ink jet recording method of this embodiment, the resin component-containing pigment ink composition and the resin component-containing clear ink composition are discharged onto the recording medium in any order desired. Specifically, the pigment ink composition can be discharged first, after which the clear ink composition is discharged, or conversely, the clear ink composition can be discharged first, after which the pigment ink composition is discharged. When a plurality of types of pigment ink composition are used, all of the pigment ink composition can be discharged first, after which the clear ink composition is discharged as an overcoat, or the clear ink composition can be discharged first as a precoat, after which the various pigment ink compositions can be discharged in any order, or part of the pigment ink composition can be discharged first, then the clear ink composition discharged, and finally the rest of the pigment ink composition discharged.

Ink Jet Recording Method in a Second Embodiment

Figure 1:
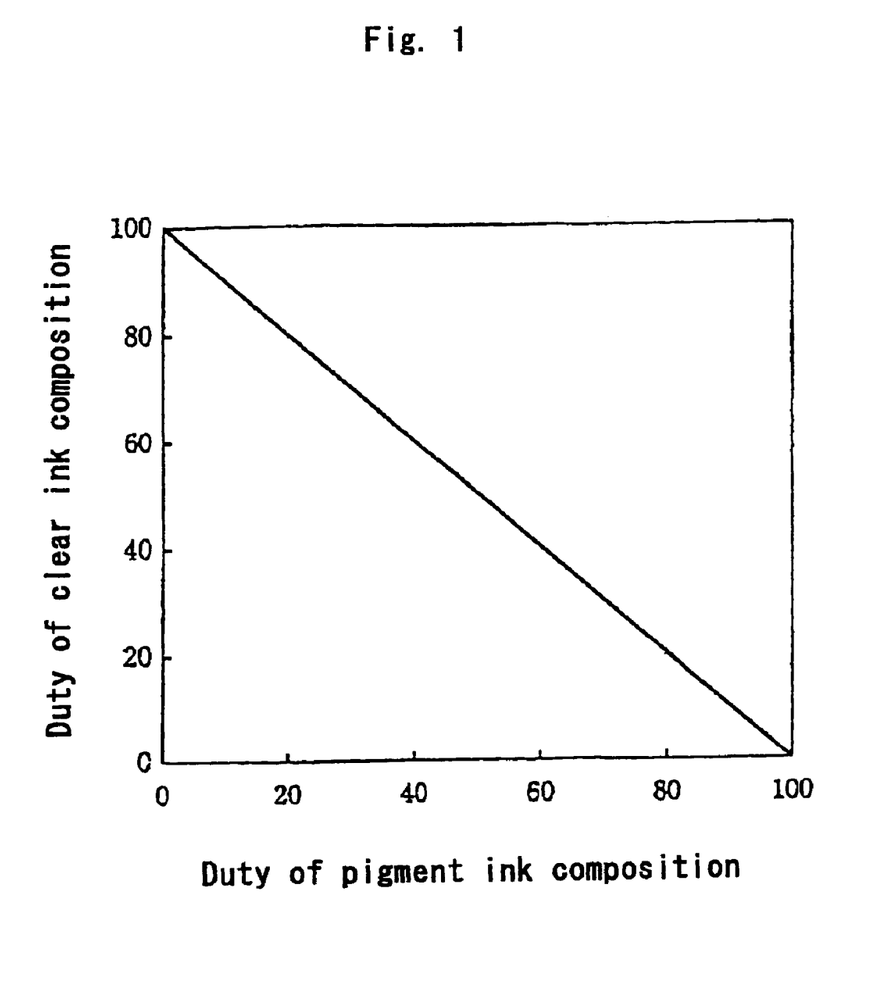
FIG. 1 is a graph of the relationship between the duty of the pigment ink composition and the duty of the clear ink composition in a second embodiment of the recording method of the present invention.

In the ink jet recording method of this embodiment, when at least one type of pigment ink composition and at least one type of clear ink composition containing a resin component but containing no colorant are discharged in the same process, the discharge amount of the clear ink composition is increased when the duty of the pigment ink composition is low, and the discharge amount of the clear ink composition is reduced when the duty is high. This makes it easier to obtain a high-quality printed image with a low gloss ratio (maximum value/minimum value) dependent on duty. For instance, the discharge amount of the clear ink composition is adjusted so that the duty of the colored ink composition and the duty of the clear ink composition are in the relation expressed by the graph in FIG. 1.

The gloss is measured with a PG-1 gloss meter (made by Nippon Denshoku Kogyo K.K.).

The pigment ink composition and the clear ink composition may each be used as a single type or a plurality of types in the recording method in this embodiment, but a particularly favorable combination is one in which there are at least two types of pigment ink composition and just one clear ink composition.

A resin component is an essential constituent component of the clear ink composition used in the recording method in this embodiment. Also, unlike ordinary ink compositions, this clear ink composition contains no colorant. There is therefore no need for a dispersant that would disperse a colorant in the clear ink composition. All the components of the clear ink composition other than the resin component are the same as the components contained in ink compositions used in ordinary ink jet recording.

The resin component content in the clear ink composition should be 0.1 to 10 wt %, and preferably 0.3 to 5 wt %.

Just as with the recording method in the first embodiment given above, the resin component in this embodiment can be used in a state in which a resin is dissolved in water, or in a state of fine particles of polymer in water. It is particularly favorable for fine particles of polymer to be added as a resin emulsion to the clear ink composition. Thus adding the resin in the form of fine particles of polymer enhances the film formability of the clear ink composition, and also improves the wear resistance and coloration of the resulting image.

The resin emulsion can be manufactured by a known emulsion polymerization process. For instance, a resin emulsion of fine particles of polymer can be manufactured by subjecting an unsaturated vinyl monomer to emulsion polymerization in water in the presence of a surfactant (emulsifier), polymerization catalyst, polymerization initiator, molecular weight regulator, neutralizer, and so forth.

In forming this resin emulsion, it is preferable for 100 weight parts fine particles of polymer to be dispersed in at least 60 weight parts and no more than 400 weight parts of an aqueous medium, and it is even better for the amount of the latter to be at least 100 weight parts and no more than 200 weight parts.

There are no particular restrictions on the average particle diameter of the fine particles of polymer, but from the standpoint of dispersion stability in ink, 200 nm or smaller is preferred, with at least 5 nm and no more than 10 nm being even better.

The glass transition point (measured according to JIS K 6900) of the fine particles of polymer should be at least −15° C. and no higher than 150° C., and preferably at least 10° C. and no higher than 80° C.

It is also preferable for the fine particles of polymer to have a hydrophilic portion and a hydrophobic portion.

The fine particles of polymer can have a single-phase structure, multi-phase structure (core/shell structure), or the like. This core/shell structure may be one in which two or more different types of polymer are present in separate phases, such as a structure in which the shell completely covers the core, a structure in which the shell covers only part of the core, a structure in which part of the shell polymer forms a domain or the like within the core polymer, or a multilayer structure of three or more layers in which one or more layers of different composition are further included between the core and the shell.

If the above-mentioned fine particles of polymer have the above-mentioned core/shell structure, it is preferable for the core to be composed of a polymer having epoxy groups, and for the shell to be composed of a polymer having carboxyl groups. This is because the epoxy groups of the core and the carboxyl groups of the shell bond together and form a reticulated structure, so a strong protective film that covers the print surface can be formed when this ink is printed on a recording medium.

It is preferable for the above-mentioned fine particles of polymer to comprise 1 to 10 wt % a structure originating in an unsaturated vinyl monomer having carboxyl groups or sulfonic acid groups, and 0.2 to 4 wt % a crosslinked structure produced by a crosslinkable monomer having preferably two or more, and even more preferably three or more, polymerizable double bonds (structure originating in a crosslinkable monomer). When an ink contains fine particles of polymer such as these, it is more difficult for a nozzle plate surface to be wetted by that ink, so scattering of the ink droplets can be prevented, and the discharge stability can be further enhanced.

Examples of the above-mentioned unsaturated vinyl monomer having carboxyl groups include acrylic acid, methacrylic acid, itaconic acid, fumaric acid, and maleic acid, with methacrylic acid being particularly favorable.

Examples of the above-mentioned crosslinkable monomer include polyethylene glycol acrylate, triethylene glycol diacrylate, 1,3-butylene glycol diacrylate, 1,6-butylene glycol diacrylate, 1,6-hexanediol diacrylate, neopentyl glycol diacrylate, 1,9-nonanediol diacrylate, polypropylene glycol diacrylate, 2,2'-bis(4-acryloxypropyroxyphenyl)propane, 2,2'-bis(4-acryloxydiethoxyphenyl)propane, and other such diacrylate compounds; trimethylolpropane triacrylate, trimethylolethane triacrylate, tetramethylolmethane triacrylate, and other such triacrylate compounds; ditrimethylol tetraacrylate, tetramethylolmethane tetraacrylate, pentaerythritol tetraacrylate, and other such tetraacrylate compounds; dipentaerythritol hexaacrylate and other such hexaacrylate compounds; ethylene glycol dimethacrylate, diethylene glycol dimethacrylate, triethylene glycol dimethacrylate, polyethylene glycol dimethacrylate, 1,3-butylene glycol dimethacrylate, 1,4-butylene glycol dimethacrylate, 1,6-hexanediol dimethacrylate, neopentyl glycol dimethacrylate, dipropylene glycol dimethacrylate, polypropylene glycol dimethacrylate, polybutylene glycol dimethacrylate, 2,2'-bis(4-methacryloxydiethoxyphenyl) propane, and other such dimethacrylate compounds; trimethylolpropane methacrylate, trimethylolethane trimethacrylate, and other such trimethacrylate compounds; and methylenebisacrylamide, divinylbenzene, and so forth.

Examples of the above-mentioned unsaturated vinyl monomer (the monomer constituting the fine particles of polymer) include acrylic ester monomers, methacrylic ester monomers, aromatic vinyl monomers, vinyl ester monomers, vinyl cyan compound monomers, halogenated monomers, olefin monomers, and diene monomers commonly used in emulsion polymerization. Specific examples include methyl acrylate, ethyl acrylate, isopropyl acrylate, n-butyl acrylate, isobutyl acrylate, n-amyl acrylate, isoamyl acrylate, n-hexyl acrylate, 2-ethylhexyl acrylate, octyl acrylate, decyl acrylate, dodecyl acrylate, octadecyl acrylate, cyclohexyl acrylate, phenyl acrylate, benzyl acrylate, glycidyl acrylate, and other such acrylic esters; methyl methacrylate, ethyl methacrylate, isopropyl methacrylate, n-butyl methacrylate, isobutyl methacrylate, n-amyl methacrylate, isoamyl methacrylate, n-hexyl methacrylate, 2-ethylhexyl methacrylate, octyl methacrylate, decyl methacrylate, dodecyl methacrylate, octadecyl methacrylate, cyclohexyl methacrylate, phenyl methacrylate, benzyl methacrylate, glycidyl methacrylate, and other such methacrylic esters; vinyl acetate and other such vinyl esters; acrylonitrile and other such vinyl cyan compounds; vinylidene chloride, vinyl chloride, and other such halogenated monomers; styrene, 2-methylstyrene, vinyltoluene, tert-butylstyrene, chlorostyrene, vinylanisol, vinylnaphthalene, and other such aromatic vinyl monomers; ethylene, propylene, isopropylene, and other such olefins; butadiene, chloroprene, and other such dienes; and vinyl ether, vinyl ketone, vinyl pyrrolidone, and other such vinyl monomers.

Examples of surfactants include dodecylbenzenesulfonic acid sodium salt, lauric acid sodium salt, an ammonium salt of a polyoxyethylene alkyl ether sulfate, and other such anionic surfactants; and polyoxyethylene alkyl ether, polyoxyethylene alkyl ester, polyoxyethylene sorbitan fatty acid ester, polyoxyethylene alkyl phenyl ether, polyoxyethylene alkylamine, polyoxyethylene alkylamide, and other such nonionic surfactants. These can be used singly or in combinations of two or more types. Acetylene glycols can also be used (Olefin Y and STG and Surfinol 82, 104, 440, 465, and 485 (all made by Air Products and Chemicals, Inc.)).

The surfactant should be added in an amount of at least 0.05 wt % and no more than 5 wt %, and preferably at least 0.1 wt % and no more than 1.5 wt %, in the clear ink composition.

During the manufacture of the resin emulsion, it is preferable from the standpoint of increasing printing stability if the above-mentioned unsaturated vinyl monomer is added during the emulsion polymerization so that one or more compounds selected from the group consisting of acrylamides and hydroxyl group-containing monomers are contained. Examples of these acrylamides include acrylamide and N,N'-dimethylacrylamide, and one or more types of these can be used. Examples of these hydroxyl group-containing monomers include 2-hydroxyethyl acrylate, 2-hydroxyethyl methacrylate, and 2-hydroxypropyl methacrylate, and one or more types of these can also be used.

When the above-mentioned fine particles of polymer have the above-mentioned core/shell structure, the resin emulsion containing them can be manufactured, for example, by the method disclosed in Japanese Laid-Open Patent Application H4-76004 (multi-stage emulsion polymerization of the above-mentioned unsaturated vinyl monomer).

As discussed above, it is preferable for the core part of the fine particles of polymer with a core/shell structure to be composed of a polymer having epoxy groups, and examples of methods for introducing epoxy groups to the core include a method in which glycidyl acrylate, glycidyl methacrylate, allyl glycidyl ether, or another such unsaturated vinyl monomer having epoxy groups is copolymerized with another unsaturated vinyl monomer, and a method in which an epoxy compound is added simultaneously during the preparation of the core (core particles) by polymerizing one or more types of unsaturated vinyl monomer, so that these components are compounded. The former method is particularly favorable in terms of ease of polymerization, polymerization stability, and so forth.

The pigment ink composition used in the recording method of this embodiment contains a pigment as a colorant, and all other components, such as a dispersant, are the same as those contained in an ordinary ink jet recording pigment ink composition. The details regarding this pigment ink composition (such as the pigment content and type of pigment) are the same as those of the pigment ink composition used in the recording method of the first embodiment.

In particular, when the image to be formed consists of letters, it is favorable for a cyan ink composition, magenta ink composition, yellow ink composition, and black ink composition to be used as the pigment ink composition, and when the image is a photograph, it is favorable to use a light cyan ink composition, light magenta ink composition, or other such light pigment ink composition in addition to the above pigment ink compositions (dark pigment ink compositions).

The ink jet recording method in this embodiment is carried out, for example, through a printing process involving an ink jet recording printer that makes use of software such as a driver.

Specifically, the driver detects the color to be discharged onto the recording medium and outputs to the printer a signal representing a duty combination for the above-mentioned pigment ink composition corresponding to this color. If the duty of the pigment ink composition is low here, the discharge amount of the clear ink composition is adjusted to be larger. If the duty of the pigment ink composition is high, however, the discharge amount of the clear ink composition is adjusted to be smaller. For instance, the discharge amount of the clear ink composition is adjusted so that the duty of the pigment ink composition and the duty of the clear ink composition are in the relationship shown by the graph in FIG. 1.

The driver also adjusts the discharge amount of the clear ink composition. Specifically, the discharge amount of the clear ink composition is determined as discussed above on the basis of the duty of the pigment ink composition corresponding to the color detected by the driver. The determined discharge amount of the clear ink composition is outputted to the printer as a signal representing the duty combination.

The printer head inside the printer is driven according to the signals outputted from the driver, and the pigment ink compositions and clear ink composition are discharged in their respective discharge amounts at the same time from an ink cartridge equipped with the pigment ink compositions and clear ink composition.

The printer head used here is provided with pigment ink nozzles for discharging the pigment ink compositions, and a clear ink nozzle for discharging the clear ink composition. The above-mentioned ink cartridge is one that houses in its interior the above-mentioned pigment ink compositions and clear ink composition, and is disposed on the inside of the nozzles of the printer head.

Therefore, with the recording method of the present invention, there is no need for an apparatus for detecting the duty of the pigment ink compositions, an apparatus for controlling the discharge amount of the pigment ink composition which is to be discharged according to this detection information, or other such hardware, and even so it is easy to form a high-quality printed image with a low gloss ratio (maximum value/minimum value) dependent on duty.

The following are examples of combinations of pigment ink composition and clear ink composition when the above-mentioned ink cartridge is used.

(1) An ink cartridge containing one clear ink composition and five different pigment ink compositions, comprising a magenta ink composition (M), a light magenta ink composition (Lm), a cyan ink composition (C), a light cyan ink composition (Lc), and a yellow ink composition (Y).

(2) An ink cartridge containing one clear ink composition and four different pigment ink compositions, comprising a magenta ink composition (M), a cyan ink composition (C), a yellow ink composition (Y), and a black ink composition (Bk).

(3) An ink cartridge containing one clear ink composition and six different pigment ink compositions, comprising a magenta ink composition (M), a light magenta ink composition (Lm), a cyan ink composition (C), a light cyan ink composition (Lc), a yellow ink composition (Y), and a black ink composition (Bk).

The ink cartridge can also be a so-called two-liquid type, which contains one clear ink composition and just one pigment ink composition (one color). Furthermore, a plurality of combinations of two-liquid type ink cartridges may be used, in which there is a clear ink composition for every type of color ink composition (every color). In this case, the effect of the present invention can be further enhanced by suitably adjusting the discharge amount of the clear ink composition for each type of pigment ink composition.

The result of using the ink jet recording method in the above embodiment is that recorded material will be obtained in which the printed image is of high quality and has a low gloss ratio (maximum value/minimum value) dependent on duty.

Ink Jet Recording Method in a Third Embodiment

The ink jet recording method of this embodiment provides a recording method in which the discharge amount is adjusted so that the gloss over the entire recording surface of the recording medium after recording is substantially uniform, which is accomplished by adjusting the combined discharge amount of the pigment ink compositions and clear ink composition to be constant when the duty of the pigment ink compositions is low, and when the duty of the pigment ink composition is high, keeping the discharge amount of the clear ink composition at a constant small amount regardless of the duty of the pigment ink composition. The effect of this embodiment is that the amount of clear ink composition used can be kept to the required minimum.

With this embodiment, it is particularly favorable to perform the above-mentioned switching for the adjustment of the discharge amount of the clear ink composition at the point when the duty of the pigment ink composition is 20 to 60%, and especially 30 to 50%.

Also, with this embodiment, when the duty of the pigment ink composition is low, it is preferable if the combined discharge amount of the pigment ink composition and clear ink composition is between 20 and 60% as the total duty, and when the duty of the pigment ink composition is high, it is preferable if the discharge amount of the clear ink composition is kept constant at a duty between 1 and 20%.

Also, with this embodiment, it is preferable for the pigment ink composition and the clear ink composition both to contain fine particles of polymer, because this will result in a lower gloss ratio (maximum value/minimum value) dependent on duty.

Unless specifically discussed otherwise, everything in this embodiment is suitably carried out in the same manner as in the first and second embodiments above.

Ink Jet Recording Method in Other Embodiments

The present invention further provides the other embodiments listed below. Anything that is not specifically discussed in these other embodiments can be suitably carried out in the same manner as in the first and second embodiments given above.

An embodiment can be provided in the ink jet recording method of the present invention in which a light-colored clear ink composition is used as the clear ink composition for adjusting the discharge amount so that the gloss will be substantially uniform over the entire recording surface of the recording medium after recording.

The term "light color" is defined in this Specification as a color saturation of 10 or less at the time of printing.

There are no limitations on the hue of the light-colored clear ink composition used in this embodiment, but it is particularly favorable for the hue to be yellow or white, that is, to use a clear ink composition that is pale yellow or pale white in color. If a pale yellow clear ink composition is used, the image storage stability will be improved and there will be a reduction in red shine (a phenomenon whereby a cyan image looks red when viewed from a certain angle). The use of a light-color clear ink composition also helps adjust the color of the substrate.

An embodiment can be provided in the ink jet recording method of the present invention in which the discharge amount is adjusted so that the gloss will be substantially uniform over the entire recording surface of the recording medium after recording, by recording such that the dots of pigment ink composition do not overlap the dots of clear ink composition, such as by discharging the clear ink composition somewhere other than where a printed image has been produced by discharge of the pigment ink composition (ink non-adhering portion), and by recording such that the dots of pigment ink composition do overlap the dots of clear ink composition, such as by discharging the clear ink composition where a printed image has been produced by discharge of the pigment ink composition (ink adhering portion). The effect of this embodiment is that print gloss unevenness is suppressed and gas resistance is enhanced in the ink non-adhering portions, while gloss is increased and fixability is improved in the ink adhering portions.

In particular, an excellent effect can be obtained in recorded material having an ink adhering portion by recording such that the dots of pigment ink composition overlap the dots of clear ink composition.

An embodiment can be provided in the ink jet recording method of the present invention in which the discharge amount is adjusted so that the gloss will be substantially uniform over the entire recording surface of the recording medium after recording, by using a clear ink composition containing fine particles of polymer as a resin component, and a pigment ink composition similarly containing fine particles of polymer. A dispersant resin for dispersing the pigment is usually contained in the pigment ink composition, but the pigment ink composition used here also contains fine particles of polymer in addition to the dispersant resin. The effect of this embodiment is that the gloss ratio (maximum value/minimum value) dependent on duty can be further reduced.

The fine particles of polymer contained in the pigment ink composition and in the clear ink composition here can be the same or different.

Ink Set

The ink set of the present invention can be used to advantage in the above-mentioned ink jet recording method, and particularly in the ink jet recording method of the first embodiment, and contains one or more types of resin component-containing pigment ink composition and a resin component-containing clear ink composition. With a typical ink set pertaining to this embodiment, combinations of different types of pigment ink composition include a four color combination of yellow, cyan, magenta, and black; a six color combination of yellow, cyan, magenta, black, light cyan, and light magenta; a seven color combination of yellow, cyan, magenta, black, light cyan, light magenta, and dark yellow; a seven color combination of yellow, magenta, cyan, black, light black, light magenta, and light cyan; a seven color combination of yellow, cyan, magenta, black, red, green, and blue; a seven color combination of yellow, cyan, magenta, black, orange, green, and blue; and a seven color combination of yellow, magenta, cyan, black, orange, green, and violet. The clear ink composition is further combined with each of these combinations.

As discussed above, the ink compositions with "light magenta" and "light cyan" in this Specification are generally ink compositions in which the colorant concentrations of a magenta ink composition and a cyan ink composition, respectively, have been lowered for the purpose of improving the quality of the printed image through density modulation. Also, the ink composition with "dark yellow" is a yellow ink composition that makes use of a colorant (pigment) with lower brightness and saturation than a yellow ink composition for the purpose of improving the color reproducibility with respect to dark colors in shadowed portions and so forth.

The ink compositions with "red," "orange," "green," "blue," and "violet" are ink compositions used as elements constituting the intermediate colors of yellow, magenta, and cyan for the purpose of increasing color reproducibility. Further, the ink composition with "light black" is a black ink composition whose colorant (pigment) concentration has been lowered for the purpose of increasing the color reproducibility with respect to dark colors in shadowed portions and so forth, improving gray gradation, and reducing granularity.

The present invention was described in detail above on the basis of preferred embodiments thereof, but the present invention is not limited in any way by these embodiments, and various modifications are possible within the scope of the present invention.

The present invention will now be described in further detail through examples, but once again, the present invention is not limited in any way by these examples.

EXAMPLE 1

(1) Preparation of Ink Set

Ink compositions composed of the various components listed below were adjusted to make ink sets. Each ink composition was prepared by the following procedure. Pigment, a dispersant, and water were mixed, and these components were dispersed for 2 hours along with glass beads (1.7 mm diameter, 1.5 times the weight of the mixture) in a sand mill (made by Yasukawa Seisakusho). The glass beads were then removed to prepare a pigment dispersion.

Next, the components other than the pigment and dispersant were mixed to make an ink solvent, and the above-mentioned pigment dispersion was stirred while the above-mentioned ink solvent was gradually added dropwise, and the system was stirred for 20 minutes at normal temperature. This product was filtered with a 5 $\mu$m membrane filter to obtain an ink composition for ink jet recording.

The ink compositions were composed of the following components.

| | | |
|---|---|---|
| (a) | Black ink composition | |
| | carbon black MA7 (Mitsubishi Chemical) | 5 wt % |
| | styrene/acrylic acid copolymer (dispersant) | 1 wt % |
| | triethylene glycol monobutyl ether | 10 wt % |
| | glycerol | 10 wt % |
| | ion exchange water | balance |
| (b) | Cyan ink composition | |
| | C.I. Pigment Blue 15:3 | 2 wt % |
| | styrene/acrylic acid copolymer (dispersant) | 1 wt % |
| | triethylene glycol monobutyl ether | 10 wt % |
| | diethyl glycol | 10 wt % |
| | ion exchange water | balance |
| (c) | Magenta ink composition | |
| | C.I. Pigment Red 122 | 3 wt % |
| | styrene/acrylic acid copolymer (dispersant) | 1 wt % |
| | triethylene glycol monobutyl ether | 10 wt % |

-continued

| | | |
|---|---|---|
| glycerol | 5 wt % | |
| diethylene glycol | 5 wt % | |
| ion exchange water | balance | |
| (d) Yellow ink composition | | |
| C.I. Pigment Yellow 74 | 3.5 wt % | |
| styrene/acrylic acid copolymer (dispersant) | 1 wt % | |
| triethylene glycol monobutyl ether | 10 wt % | |
| glycerol | 8 wt % | |
| ion exchange water | balance | |
| (e) Light cyan ink composition | | |
| C.I. Pigment Blue 15:3 | 0.5 wt % | |
| styrene/acrylic acid copolymer (dispersant) | 1 wt % | |
| triethylene glycol monobutyl ether | 10 wt % | |
| diethylene glycol | 10 wt % | |
| ion exchange water | balance | |
| (f) Light magenta ink composition | | |
| C.I. Pigment Red 122 | 0.8 wt % | |
| styrene/acrylic acid copolymer (dispersant) | 1 wt % | |
| triethylene glycol monobutyl ether | 10 wt % | |
| glycerol | 5 wt % | |
| diethyl glycol | 5 wt % | |
| ion exchange water | balance | |
| (g) Clear ink composition | | |
| Voncoat 4001 (acrylic fine particles of polymer; resin component = 50%; MFT = 5° C.; made by Dainippon Ink & Chemicals) | 2 wt % | |
| triethylene glycol monobutyl ether | 10 wt % | |
| glycerol | 8 wt % | |
| ion exchange water | balance | |

(2) Printing Test

A printing evaluation was conducted using each of the ink compositions and the clear ink composition prepared above.

In this printing evaluation, an image "ISO/JIS-SCID (high-precision color digital standard image data) N-1 (portrait image) (Japanese Standard Association)" was formed by printing on PM photographic paper (made by Seiko-Epson) using an ink jet printer (PM900C made by Seiko-Epson), and the gloss of the printed image was measured.

This printing evaluation was conducted both for when the clear ink composition was used according to the method of the present invention (Example 1) and when no clear ink composition was used and the printing was performed with just the ink composition (Comparative Example 1). When the clear ink composition was used (Example 1), the print quantity and dot density of the various ink compositions and the clear ink composition onto the recording medium was controlled by adjusting the discharge amounts of the various ink compositions and the clear ink composition so that the total amount of resin component per unit of surface area would be substantially uniform. Table 1 below shows the specific control method. There are no restrictions on the above-mentioned discharge amount adjustment as long as the method adjusts the print quantity and dot density of the various ink compositions and the clear ink composition so that the total amount of resin component per unit of surface area is substantially uniform.

TABLE 1

| Duty of ink (%) | Duty of clear ink (%) |
|---|---|
| 100 | 0 |
| 90 | 10 |

TABLE 1-continued

| Duty of ink (%) | Duty of clear ink (%) |
|---|---|
| 80 | 20 |
| 70 | 30 |
| 60 | 40 |
| 50 | 50 |
| 40 | 60 |
| 30 | 70 |
| 20 | 80 |
| 10 | 90 |
| 0 | 100 |

(3) Gloss Evaluation

The gloss of the printed and non-printed areas of the printed image was measured with a gloss meter (PG-1M made by Nippon Denshoku Kogyo K.K.). The gloss at various angles was obtained by measuring the forward reflection at 20°, 60°, and 85°.

Table 2 shows the results for the non-printed areas, and Table 3 shows the results for the printed areas (measured at a duty of approximately 30%, which most closely approximates skin color of a face in the above-mentioned images N-I (portrait image)).

TABLE 2

| | Clear ink | 20° | 60° | 85° |
|---|---|---|---|---|
| Example 1 | yes | 82 | 108 | 103 |
| Comparative Example 1 | no | 17 | 37 | 81 |

TABLE 3

| | Clear ink | 20° | 60° | 85° |
|---|---|---|---|---|
| Example 1 | yes | 90 | 110 | 105 |
| Comparative Example 1 | no | 64 | 104 | 100 |

As is clear from Tables 2 and 3, when a clear ink composition was used (Example 1), the gloss of the printed area increased, there was less difference in gloss between the printed and non-printed areas, and there was a reduction in the overall gloss unevenness. Also, when the printed image was observed visually, the image was better when the clear ink composition was used (Example 1) than when it was not (Comparative Example 1).

EXAMPLE 2

An ink cartridge containing five pigment ink compositions (a total of five colors) composed of the components listed below, and a single clear ink composition was installed in an ink jet printer (PM-770C made by Seiko-Epson). When the duty of the pigment ink compositions was low, the discharge amount of the clear ink composition was set high, and when the duty of the pigment ink compositions was high, the discharge amount of the clear ink composition was set low, or more specifically, the ink composition duty was adjusted as shown in Table 4 (10 patterns), and a printed image corresponding to the various duties was formed on a recording medium (special gloss film made by Seiko-Epson). Here, the printed image was formed by discharging the pigment ink compositions and the clear ink composition at the same time. The gloss of the image thus obtained was measured with a PG-1M gloss meter (made by Nippon Denshoku Kogyo K.K.). After this, the gloss ratio (maximum value/minimum value) was found from the maximum and minimum gloss values.

TABLE 4

| Duty of pigment ink compositions | 0 | 10 | 20 | 30 | 40 | 50 | 60 | 70 | 80 | 90 | 100 |
|---|---|---|---|---|---|---|---|---|---|---|---|
| Duty of clear ink composition | 100 | 90 | 80 | 70 | 60 | 50 | 40 | 30 | 20 | 10 | 0 |

Pigment Ink Composition

The following pigment ink compositions were prepared: a magenta ink composition (M), a light magenta ink composition (LM), a cyan ink composition (C), a light cyan ink composition (LC), and a yellow ink composition (Y).

Magenta ink composition

| C.I. Pigment Red 122 | 3.5 wt % |
| dispersant (styrene/acrylic copolymer) | 1.3 wt % |
| glycerol | 15 wt % |
| ethylene glycol | 4 wt % |
| triethanolamine | 0.5 wt % |
| Surfinol 465 | 1 wt % |
| triethylene glycol monobutyl ether | 4 wt % |
| 2-pyrrolidone | 4 wt % |
| pure water | balance |

Light magenta ink composition

| C.I. Pigment Red 122 | 0.7 wt % |
| dispersant (styrene/acrylic copolymer) | 0.4 wt % |
| glycerol | 18 wt % |
| ethylene glycol | 5 wt % |
| Surfinol 465 | 0.8 wt % |
| triethylene glycol monobutyl ether | 5 wt % |
| 2-pyrrolidone | 4 wt % |
| pure water | balance |

Cyan ink composition

| C.I. Pigment Blue 15:3 | 2.5 wt % |
| dispersant (styrene/acrylic copolymer) | 0.9 wt % |
| glycerol | 10 wt % |
| ethylene glycol | 5 wt % |
| triethanolamine | 0.8 wt % |
| Surfinol 465 | 1 wt % |
| triethylene glycol monobutyl ether | 5 wt % |
| 2-pyrrolidone | 4 wt % |
| pure water | balance |

Light cyan ink composition

| C.I. Pigment Blue 15:3 | 0.6 wt % |
| dispersant (styrene/acrylic copolymer) | 0.4 wt % |
| glycerol | 20 wt % |
| diethylene glycol | 8 wt % |
| triethanolamine | 0.7 wt % |
| Surfinol 465 | 1.2 wt % |
| triethylene glycol monobutyl ether | 6 wt % |
| 2-pyrrolidone | 6 wt % |
| pure water | balance |

Yellow ink composition

| C.I. Pigment Yellow 128 | 4.1 wt % |
| dispersant (styrene/acrylic copolymer) | 1.8 wt % |
| glycerol | 12 wt % |
| diethylene glycol | 2 wt % |
| triethanolamine | 0.7 wt % |
| Surfinol 465 | 1 wt % |
| triethylene glycol monobutyl ether | 8 wt % |
| 2-pyrrolidone | 2 wt % |
| pure water | balance |

Clear ink composition

| resin emulsion (fine particles of polymer; 1 wt % as styrene/acrylic copolymer) | 3.3 wt % |

-continued

| glycerol | 20 wt % |
| diethylene glycol | 8 wt % |
| triethanolamine | 0.7 wt % |
| Surfinol 465 | 1.2 wt % |
| triethylene glycol monobutyl ether | 6 wt % |
| 2-pyrrolidone | 6 wt % |
| pure water | balance |

COMPARATIVE EXAMPLE 2

Everything was the same as in Example 2, except that no clear ink composition was used, and printing was performed at the same duty as in Example 2 using just the pigment ink composition, after which the gloss ratio (maximum value/minimum value) was found.

The following is the results for the gloss ratio obtained with the recording methods (one color) in Example 2 and Comparative Example 2.

| Example 1 (pigment ink composition and clear ink composition) | | Comparative Example 1 (pigment ink composition only) | |
|---|---|---|---|
| C | 1.06 | C | 1.28 |
| LC | 1.08 | LC | 2.21 |
| M | 1.31 | M | 1.59 |
| LM | 1.31 | LM | 1.51 |
| Y | 1.37 | Y | 2.20 |

EXAMPLE 3 AND COMPARATIVE EXAMPLE 3

Other than changing the monochromatic pigment ink composition to a mixed-color (plurality of colors) pigment ink composition, the gloss ratio was found in the same manner as with the recording methods in Example 2 and Comparative Example 2, the results of which are given below. In this case, just as with a monochromatic composition, when the duty of the pigment ink composition (all colors) was high, the duty of the clear ink composition was set low in printing, but when the duty of the pigment ink composition was low, the duty of the clear ink composition was set high in printing. The gloss ratio in this case was the maximum value/minimum value for gloss when printing was performed such that the duty of the pigment ink composition would be 1:1 (in the case of two colors) or 1:1:1 (in the case of three colors) within a single pass.

| Example 3 (plurality of pigment ink compositions and clear ink composition) | | Comparative Example 3 (plurality of pigment ink compositions only) | |
|---|---|---|---|
| C + M | 1.03 | C + M | 1.11 |
| C + Y | 1.04 | C + Y | 1.09 |
| M + Y | 1.01 | M + Y | 1.15 |
| C + M + Y | 1.16 | C + M + Y | 1.43 |

As is clear from the above results, with the ink jet recording methods in Examples 2 and 3, the gloss ratio is close to 1 for images of all colors (whether monochromatic or mixed color). Also, the images obtained by the ink jet recording methods of Examples 2 and 3 were all of high quality. Meanwhile, the gloss ratio of the images obtained by the recording methods of Comparative Examples 2 and 3 was greater than those for the images in Examples 2 and 3 in images of all colors, and was greater than 2 with some colors. Furthermore, the images obtained by the recording methods of Comparative Examples 2 and 3 were of diminished quality.

EXAMPLE 4

Other than adding a resin emulsion (fine particles of polymer; 1 wt % as styrene/acrylic acid copolymer) to each of the five different pigment ink compositions (total of five colors) used in the recording method of Example 2, printing was performed using five pigment ink compositions with the same components as in Example 2, using the clear ink composition (the components of which are given in Table 5) used in the recording method of Example 2 with these pigment ink compositions, and adjusting the duty of these ink compositions as shown in Table 6. Other than this, the gloss ratio (maximum value/minimum value) was found in the same manner as in Example 2.

TABLE 5

|  | Magenta | L-magenta | Cyan | L-cyan | Yellow | Clear ink |
|---|---|---|---|---|---|---|
| PR122 | 3.50% | 0.70% |  |  |  |  |
| PB15:3 |  |  | 2.50% | 0.60% |  |  |
| PY128 |  |  |  |  | 4.10% |  |
| St-Ac | 1.30% | 0.40% | 0.90% | 0.40% | 1.80% |  |
| Resin em. | 1.00% | 1.00% | 1.00% | 1.00% | 1.00% | 1.00% |
| Gly | 15.00% | 18.00% | 10.00% | 20.00% | 12.00% | 20.00% |
| EG | 4.00% | 5.00% | 5.00% |  |  |  |
| DEG |  |  |  | 8.00% | 2.00% | 8.00% |
| TEA | 0.50% |  | 80.00% | 0.70% | 0.70% | 0.70% |
| SF465 | 1.00% | 0.80% | 1.00% | 1.20% | 1.00% | 1.20% |
| TEGmBE | 4.00% | 5.00% | 5.00% | 6.00% | 8.00% | 6.00% |
| 2-Py | 4.00% | 4.00% | 4.00% | 6.00% | 2.00% | 6.00% |
| Pure water | balance | balance | balance | balance | balance | balance |

The abbreviations for the components in Table 5 are the same as for the components of the ink composition used in Example 2, except that resin em. stands for resin emulsion.

TABLE 6

| Duty of pigment ink compositions | 10 | 20 | 30 | 40 | 50 | 60 | 70 | 80 | 90 |
|---|---|---|---|---|---|---|---|---|---|
| Duty of clear ink composition | 40 | 30 | 20 | 10 | 5 | 5 | 5 | 5 | 5 |

COMPARATIVE EXAMPLE 4

The gloss ratio (maximum value/minimum value) was found in the same manner as in Example 4, except that no clear ink composition was used, only the pigment ink composition was used, and printing was performed such that the duty was the same as in Example 4.

The following table gives the results for the gloss ratios obtained with the recording methods (single color) in Example 4 and Comparative Example 4.

|  | Example 4 Clear ink composition used | Comparative Example 4 Clear ink composition not used |
|---|---|---|
| Cyan | 1.03 | 1.28 |
| L-cyan | 1.06 | 2.13 |
| Magenta | 1.27 | 1.55 |
| L-magenta | 1.28 | 1.47 |
| Yellow | 1.30 | 1.05 |

EXAMPLE 5 AND COMPARATIVE EXAMPLE 5

Other than changing the monochromatic pigment ink composition to a mixed-color pigment ink composition, the gloss ratio was found in the same manner as in the recording methods of Example 4 and Comparative Example 4, respectively, the results of which are given below. In this case, just as when a single color was used, when the duty of the pigment ink composition (all colors) was high, the duty of the clear ink composition was set low in printing, but when the duty of the pigment ink composition was low, the duty of the clear ink composition was set high in printing. The gloss ratio in this case was the maximum value/minimum value for gloss when printing was performed such that the duty of the pigment ink composition would be 1:1 (in the case of two colors) or 1:1:1 (in the case of three colors) within a single pass.

|  | Example 5 Clear ink composition used | Comparative Example 5 Clear ink composition not used |
|---|---|---|
| C + M | 1.03 | 1.17 |
| C + Y | 1.04 | 1.09 |
| M + Y | 1.02 | 1.13 |
| C + M + Y | 1.13 | 1.40 |

EXAMPLE 6

Printing was performed in the same manner as in the recording method of Example 4, except that the clear ink composition given below, which was light yellow in color, was used as the clear ink composition, and the cyan ink composition and light cyan ink composition used in the recording method of Example 1 were used as the pigment ink compositions. Specifically, the duties of the ink compositions was adjusted (10 patterns) as shown in Table 6 so that when the duty of the pigment ink compositions was low, the discharge amount of the light yellow clear ink composition was increased, and when the duty of the pigment ink compositions was high, the discharge amount of the light yellow clear ink composition was reduced. This formed printed images corresponding to the various duties on a recording medium (special gloss film made by Seiko-Epson). Here, the printed image was formed by discharging the pigment ink compositions and the light yellow clear ink composition at the same time.

| Clear ink composition (light yellow) | |
| --- | --- |
| C.I. Pigment Yellow 74 | 0.05 wt % |
| dispersant (styrene/acrylic copolymer) | 0.02 wt % |
| resin emulsion | 3.3 wt % |
| (fine particles of polymer; 1 wt % as styrene/acrylic copolymer) | |
| glycerol | 20 wt % |
| diethylene glycol | 8 wt % |
| triethanolamine | 0.7 wt % |
| Surfinol 465 | 1.2 wt % |
| triethylene glycol monobutyl ether | 6 wt % |
| 2-pyrrolidone | 6 wt % |
| pure water | balance |

EXAMPLE 7

A printed image was formed in the same manner as in Example 6, except that the light yellow clear ink composition was changed to the colorless clear ink composition used in the recording method of Example 2.

Evaluating Red Shine of Cyan Color

Ten types of printed image (cyan color) with different duties obtained by the recording methods of Example 6 (using a light yellow clear ink composition) and Example 7 (using a colorless clear ink composition) were viewed from various angles and evaluated according to the following criteria as to whether the printed image looked red.

Evaluation A: No red coloration noted for any pattern.

Evaluation B: Red coloration noted in 1 to 4 patterns.

Evaluation C: Red coloration noted in 5 or more patterns.

The evaluation of red shine of cyan color resulted in the following.

Example 6: A, Example 7: C

EXAMPLE 8

Printing was performed and a printed image formed in the same manner as in the recording method of Example 4, except that the five types of pigment ink composition used in the recording method of Example 4 were used as the pigment ink composition, and the light yellow clear ink composition used in the recording method of Example 6 was used as the clear ink.

Evaluation of Gas Resistance

Printed images of different duty obtained by the recording method of Example 8 (using a light yellow clear ink composition) were exposed for 6 hours to an ozone atmosphere with a concentration of 200 ppm using a weather resistance tester (OMS-H Ozone Weatherometer made by Suga Test Instruments). The various patterns were subjected to colorimetry after exposure, the change in color compared to the initial color was measured, and an evaluation based on the following criteria was made for each color. The printed images obtained by the recording method of Example 4 in which a colorless clear ink composition was used were similarly evaluated.

Evaluation A: The change in color was less than 10 for all patterns.

Evaluation B: The maximum change in color was at least 10 and less than 15.

Evaluation C: The maximum change in color was at least 15.

The evaluation of gas resistance resulted in the following.

|  | Example 8 (Pigment ink composition and light yellow clear ink composition) | Example 4 (pigment ink composition and colorless clear ink composition) |
| --- | --- | --- |
| Cyan | A | B |
| L-cyan | A | B |
| Magenta | A | B |
| L-magenta | A | B |
| Yellow | A | A |

INDUSTRIAL APPLICABILITY

With the ink jet recording method and ink set of the present invention, it is easy to obtain recorded material that has excellent weather resistance and greatly reduced gloss unevenness, without entailing higher cost or the modification or increased size of the ink jet recording apparatus.

Also, the ink jet recording method of the present invention gives a high-quality image with a small gloss ratio (maximum value/minimum value) dependent on duty. Moreover, the recorded material of the present invention has this high-quality image with a small gloss ratio (maximum value/minimum value) dependent on duty.

What is claimed is:

1. In an ink jet recording method, in which a pigment ink composition and a clear ink composition containing a resin component are discharged to record information on a recording medium with formation on the recording medium of printed areas and non-printed areas, the improvement comprising adjusting discharge amount of the clear ink composition so that (a) the clear ink composition is discharged on both the printed and non-printed areas, and (b) a gloss is formed that is substantially uniform over an entire recording surface of the recording medium after recording.

2. The ink jet recording method according to claim 1, wherein a combined discharge amount of the pigment ink composition and the clear ink composition is adjusted so as to be constant when the duty of the pigment ink composition is low, and when the duty of the pigment ink composition is high, a discharge amount of the clear ink composition is kept at a constant small amount regardless of the duty of the pigment ink composition.

3. The ink jet recording method according to claim 2, wherein the combined discharge amount is set to between 20 and 60%, as the total duty, when the duty of the pigment ink composition is low, and the discharge amount of the clear ink composition is kept constant between a duty of 1 to 20% when the duty of the pigment ink composition is high.

4. The ink jet recording method according to claim 2, wherein the pigment ink composition and the clear ink composition both include fine particles of polymer.

5. The ink jet recording method according to claim 4, in which a plurality of types of the pigment ink composition are used, wherein these pigment ink compositions and the clear ink composition are discharged in any order.

6. The ink jet recording method according to claim 5, wherein the pigment ink composition is a water-based pigment ink composition, and the clear ink composition is a water-based clear ink composition.

7. The ink jet recording method according to claim 6, wherein the clear ink composition is transparent, colorless, and/or achromatic.

8. The ink jet recording method according to claim 7, wherein the clear ink composition is light-colored.

9. The ink jet recording method according to claim 8, wherein the clear ink composition further contains a light resistance enhancer.

10. The ink jet recording method according to claim 9, wherein the light resistance enhancer is at least one type of compound selected from the group consisting of water-soluble hindered amine-based light stabilizers, benzotriazole compounds, and phenol-based antioxidants.

11. The ink jet recording method according to claim 10, wherein the resin component in the clear ink composition is a dissolved water-soluble resin, fine particles of polymer, or a resin dispersant.

12. The ink jet recording method according to claim 11, wherein the recording surface of the recording medium is a high duty region, a low duty region, and/or a non-discharge region in relation to the pigment ink composition.

13. The ink jet recording method according to claim 12, wherein the resin component of the clear ink composition is added as a resin emulsion of fine particles of polymer.

14. The ink jet recording method according to claim 13, wherein the recording is performed such that dots of the pigment ink composition and the clear ink composition overlap.

15. Recorded material, comprising a printed image formed on a recording medium by the ink jet recording method according to claim 14.

16. An ink jet recording method, in which a pigment ink composition containing a resin component and a clear ink composition containing a resin component are discharged in any order to record information on a recording medium having an ink receiving layer,
wherein the discharge amount of the pigment ink composition containing a resin component and the discharge amount of the clear ink composition containing a resin component are adjusted so that the total amount of resin component per unit of surface area will be substantially uniform over the entire recording surface of the resin medium.

17. The ink jet recording method according to claim 16, wherein the resin component in the pigment ink composition is a dissolved water-soluble resin, fine particles of polymer, a resin encapsulating a pigment, or a resin dispersant.

18. In an ink jet recording method, in which at least one type of pigment ink composition and at least one type of clear ink composition containing a resin component but containing no colorant are discharged in the same process to form a printed image on a recording medium, the improvement comprising adjusting a discharge amount of the clear ink composition according to a duty of the pigment ink composition and to reduce a gloss differential between printed and non-printed areas of the recording medium, wherein the discharge amount of the clear ink composition is increased when the duty of the pigment ink composition is low, and the discharge amount of the clear ink composition is reduced when the duty of the pigment ink composition is high.

19. An ink jet recording method, comprising discharging a pigment ink composition and a clear ink composition containing a resin component to record information on a recording medium, wherein a discharge amount of the pigment ink composition or a discharge amount of the clear ink composition or both are adjusted so that a gloss will be substantially uniform over an entire recording surface of the recording medium after recording, wherein a combined discharge amount of the pigment ink composition and the clear ink composition is adjusted so as to be constant when a duty of the pigment ink composition is low, and when the duty of the pigment ink composition is high, the discharge amount of the clear ink composition is kept at a constant small amount regardless of the duty of the pigment ink composition, and wherein the combined discharge amount is set to between 20 and 60%, as a total duty, when the duty of the pigment ink composition is low, and the discharge amount of the clear ink composition is kept constant between a duty of 1 to 20% when the duty of the pigment ink composition is high.

* * * * *